US005122097A

United States Patent [19]

Chasteen et al.

[11] Patent Number: 5,122,097

[45] Date of Patent: Jun. 16, 1992

[54] APPARATUS FOR PRE-SPINNING A CONTAINER

[75] Inventors: Howard Chasteen, Westminster; Earl Backes, Arvada, both of Colo.

[73] Assignee: Ball Corporation, Muncie, Ind.

[21] Appl. No.: 666,790

[22] Filed: Mar. 8, 1991

[51] Int. Cl.[5] .............. F16H 7/00

[52] U.S. Cl. .............. 474/84; 474/88

[58] Field of Search .............. 474/84-88

[56] References Cited

U.S. PATENT DOCUMENTS

| | | | |
|---|---|---|---|
| 4,664,646 | 5/1987 | Rorabaugh | 474/88 |
| 4,832,663 | 5/1989 | Howard, Jr. | 474/88 |

*Primary Examiner*—Thuy M. Bui

*Attorney, Agent, or Firm*—Gilbert E. Alberding

[57] ABSTRACT

An apparatus (40) for pre-spinning a container (44) to be treated on an external surface by a treating surface (66) of a rotating treatment device (68) is provided. The apparatus (40) comprises a first circular drive mechanism (50) which is selectively connectable to a first rotatable drive shaft (48) from a direction transverse to a longitudinal axis of the first rotatable drive shaft (48). A second circular drive mechanism (56) mounted on a second rotatable drive shaft (60) is operatively associated with the first circular drive mechanism (50). A third circular drive (62) mounted on the second rotatable drive shaft (60) drives a belt (42) which selectively contacts circumferential portions of the container (44) or container support causing the container (44) to spin.

9 Claims, 3 Drawing Sheets

APPARATUS FOR PRE-SPINNING A CONTAINER

TECHNICAL FIELD OF THE INVENTION

This invention relates in general to machinery for treating an external surface of a container, and in particular to an apparatus for pre-spinning a container to be treated on an external surface by a treating surface of a rotating treatment device.

BACKGROUND OF THE INVENTION

Containers are often pre-treated on an external surface prior to the printing of product information thereupon. One method of such treatment has been accomplished by contacting the surface to be treated with a treating surface, such as an ink blanket, of a rotating treatment device or decorator. A problem encountered with such devices is the tendency of the container surface to slide relative to the treatment surface when the speeds of the two surfaces are not equalized prior to contact. Such sliding may result in less than optimal treatment coverage or, in the case of printing applications, a smearing of the information sought to be conveyed.

One method of equalizing the speeds of a treatment surface and a container surface involves pre-spinning the container prior to contact with the treatment surface. Typically, the container is mounted on a rotatable mandrel during transport through a production line which includes the treatment device. In such production lines, pre-spinning of the container may be accomplished by contacting a circumferential surface of the container or mandrel with a moving surface, such as a belt, so that the belt causes the container to spin.

Prior art pre-spinning devices are typically used with a rotating blanket wheel mounted on a wheel drive shaft. The rotating blanket wheel or decorator has a number of circumferential blanket surfaces adapted to print on an external container surface. Power is taken from the wheel drive shaft through a series of gears to drive a pre-spinning belt which pre-spins the container. First, a drive gear which is mounted on and driven by the wheel drive shaft turns a nylon gear which in turn drives a spur gear. The spur gear is connected to a cross-over shaft which is parallel to and spaced apart from the wheel drive shaft and drives a first timing pulley. The first timing pulley drives a second timing pulley through an interconnected timing belt. Finally, the second timing pulley drives a pre-spin pulley which drives the pre-spin belt thereby spinning the container.

The prior art devices typically have many interconnecting drive components which are relatively expensive and require frequent maintenance. In addition, installation or replacement of the components is a difficult undertaking which typically renders the treatment device unusable for lengthy periods of time. For example, to replace the drive gear, it is necessary to slide the old gear longitudinally over an end of the drive shaft which requires extensive tear down of the treatment device housing.

Thus, there is a need for an apparatus for pre-spinning a container to be treated on an external surface by a treating surface of a rotating treatment device which has fewer interconnecting parts and is therefore relatively less expensive. In addition, there is a need for such a device which can be installed with reduced treatment device down time resulting in further savings.

SUMMARY OF THE INVENTION

The present invention disclosed herein comprises an apparatus for pre-spinning a container to be treated on an external surface by a treating surface of a rotating treatment device. The invention reduces the number of moving parts necessary to pre-spin the container and reduces maintenance costs. The invention also reduces treatment device down time incident to installation of apparatus components and periodic maintenance.

In accordance with one aspect of the invention, an apparatus for pre-spinning a container to be treated by a treating surface of a rotating treatment device is provided. The apparatus comprises a belt to pre-spin the container so that the speed of the external surface of the container is approximately equal to the speed of the treating surface of the rotating treatment device. The belt is positioned to selectively contact circumferential portions of the external surface of the container or a container support, such as a rotatable mandrel, thereby spinning the container prior to the container's contact with the treatment device.

A belt drive assembly comprising a first rotatable drive shaft and a first circular drive means mounted thereon is operatively interconnected with the belt. The first circular drive means is selectively connectable to the first rotatable drive shaft from a direction transverse to a longitudinal axis of the first rotatable drive shaft. For example, the first circular drive means comprises a split mounted sprocket which allows connection to the first rotatable drive shaft from a direction transverse to a longitudinal axis of the first rotatable drive shaft without the need to slide the sprocket in a longitudinal direction over an end of the first rotatable drive shaft.

The belt drive assembly further comprises a second rotatable drive shaft and a second circular drive means operatively associated with the first circular drive means. The second circular drive means may be selectively connectable to the second rotatable shaft from a direction transverse to a longitudinal axis of the second rotatable shaft. A third circular drive means is mounted on the second rotatable drive shaft for driving the belt which spins the container. In operation, the first rotatable drive shaft may be codriven with the rotating treatment device. The second circular drive means may further comprise a split mounted sprocket having a drive chain interconnected to the first circular drive means.

It is a technical advantage of the present invention that a pre-spin belt drive assembly is simplified in comparison to the prior art devices. It is a further technical advantage of the present invention that the treatment device down time associated with the installation thereof is substantially reduced as is the typical maintenance time.

BRIEF DESCRIPTION OF THE DRAWINGS

For a more complete understanding of the present invention and for further advantages thereof, reference is now made to the following Detailed Description taken in conjunction with the accompanying Drawings, in which.

DETAILED DESCRIPTION OF THE INVENTION

Figure 1:
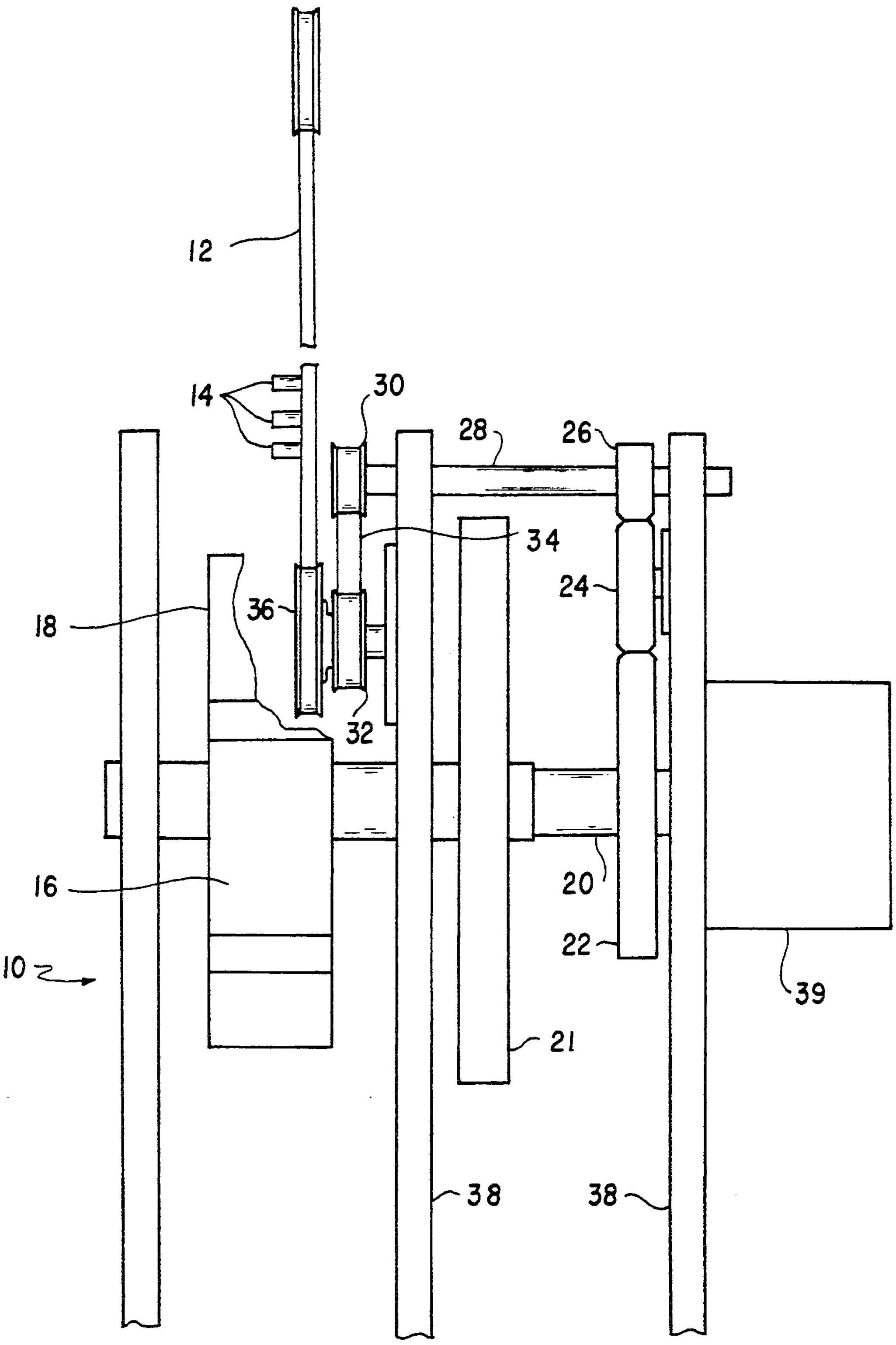
FIG. 1 (PRIOR ART)
FIG. 1 is a front elevational view of a pre-spinning apparatus constructed in accordance with the prior art.

Referring to FIG. 1, a front elevational view of a prespinning apparatus constructed in accordance with the prior art is generally identified by the reference numeral 10. The apparatus 10 comprises a belt 12 to a pre-spin a container 14 to be treated by a treating surface 16 of a rotating treatment device 18 (partially broken away for the sake of clarity of illustration). The treatment device 18 comprises, for example, a blanket wheel of a decorator assembly adapted to print on an external surface of the container 14. The belt 12 prespins the container 14 prior to contact with the treatment device 18 so that the speed of the external surface of the container 14 is approximately equal to the speed of the treating surface 16, thereby reducing the likelihood of distorted printing on the container 14.

The treatment device 18 is mounted on a first rotatable drive shaft 20 so that it rotates therewith. A bull gear 21 is also mounted on the first rotatable drive shaft 20 to drive other devices (not shown). The bull gear 21 as well as portions of a treatment device housing 38 presents an obstacle to transferring power from a first drive gear 22 to the belt 12 thus necessitating some of the apparatus 10. The drive gear 22, mounted on the first rotatable drive shaft 20, drives a nylon gear 24 which in turn drives a spur gear 26 mounted on a rotatable cross-over shaft 28. The cross-over shaft 28 is parallel to and spaced apparatus from the first drive shaft 20. The distance the shaft 28 is spaced apart from the shaft 20 is dependent on the radius of the bull gear 21, which must be cleared. A first timing pulley 30 mounted on the rotatable cross-over shaft 28 opposite the spur gear 26 drives a second timing pulley 32 by a timing belt 34. The second timing pulley 32 rotates in unison with a pre-spin pulley 36 which drives the belt 12. Finally, the belt 12 contacts circumferential portions of the external surface of the container 14 or a container support, such as a rotatable mandrel, thereby spinning the container 14.

Installing and repairing components of the apparatus 10 is a difficult and time consuming undertaking. For example, to replace the drive gear 22, it is necessary to remove the old drive gear 22 by sliding it longitudinally over an end of the first rotatable drive shaft 20. Extensive tear down of the apparatus 10 and treatment device 18 including the treatment device housing 38 and a reduction drive unit 39 is required to free the drive gear 22 all of which may take many hours. It will be appreciated that, obviously, the treatment device 18 is rendered unusable during the replacement or repair process.

Figure 2:
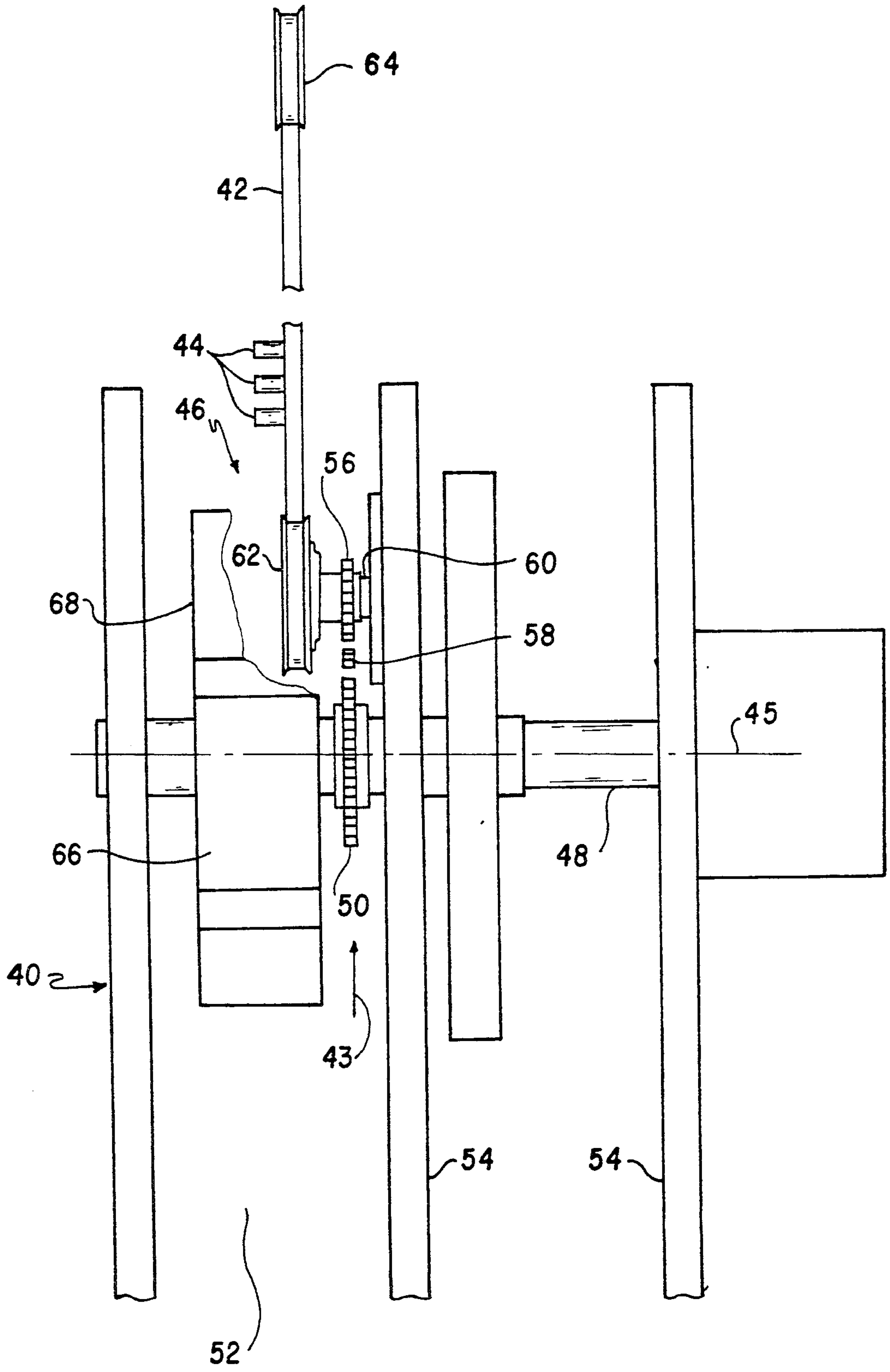
FIG. 2 is a front elevational view of a pre-spinning apparatus constructed in accordance with an embodiment of the present invention.
Figure 3:
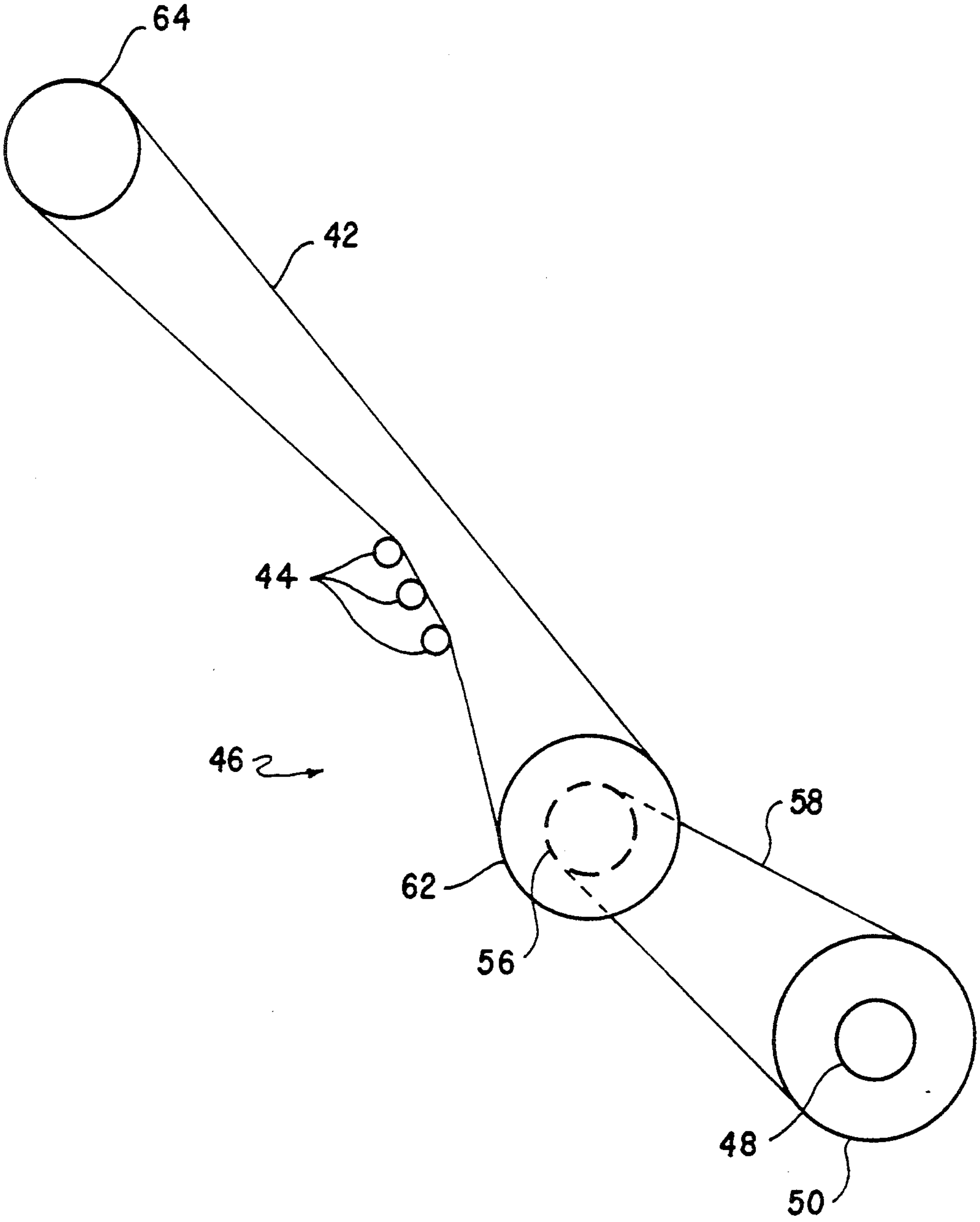
FIG. 3 is a side elevational vie of a pre-spinning apparatus constructed in accordance with an embodiment of the present invention.

Referring simultaneously to FIGS. 2 and 3, front and side elevational views, respectively, of a pre-spinning apparatus constructed in accordance with an embodiment of the present invention is generally identified by the reference numeral 40. The pre-spinning apparatus 40 comprises a belt 42 positioned to selectively contact circumferential portions of an external surface of a container 44, such as an aluminum can, or a container support, such as a rotatable mandrel, and a belt drive assembly generally identified by the reference numeral 46. A treating surface 16 of a rotating treatment device 68 contacts the external surface of the container 44 for the desired treatment thereof.

The belt drive assembly 46 comprises a first rotatable drive shaft 48 and a first circular drive means 50 mounted thereon and is operatively interconnected with the belt 42. The first circular drive means 50 is selectively connectable to the first rotatable drive shaft 48 from a direction 43 transverse to a longitudinal axis 45 of the shaft 48. Although the direction 43 is shown to be from below the shaft 48, it is to be understood that the direction 43 is more generally any appropriate direction lying in a plane that is transverse to the shaft 48. For example, the first circular drive means 50 may comprise a split mounted sprocket to allow connection of the sprocket to the first rotatable drive shaft 48 without the need to longitudinally slide the sprocket over an end of the shaft 48. The first circular drive means 50 is located so that it is accessible for maintenance through a space 52 in the treatment device housing 54.

In the illustrated embodiment, the belt 42 is operatively connected to the first circular drive means 50 through a second circular drive means 56. The second drive means 56 comprises, for example, a split mounted sprocket and is interconnected to the first drive means 50 by a chain 58. The second circular drive means 56 is mounted on a second rotatable drive shaft 60 which is parallel to and spaced from the first shaft 48. The second shaft 60 is rotatably mounted on the housing 54 and drives the belt 42 through a third circular drive means 62 which is also mounted on the second rotatable drive shaft 60. The third circular drive means 62 comprises, for example, a timing pulley. The illustrated embodiment also includes a tension member 64, such as a second pulley, to assist in maintaining proper tension in the belt 42.

In operation, the first rotatable drive shaft 48 codrives the treatment device 68 and the belt drive assembly 46. The second rotatable drive shaft 60 is also codriven by the first rotatable drive shaft 48 by the first circular drive means 50 and the second circular drive means 56. Finally, the belt 42 is codriven with the second rotatable drive shaft 60 through the third circular drive means 62. The diameters of the first, second, and third circular drive means, 50, 56 and 62, may be selected so that the belt 42 causes the speed of the external surface of the container 44 to be approximately equal to the speed of a treating surface 66 of a treatment device 68.

The apparatus 40 has a number of advantages over the pre-spin apparatus 10 of FIG. 1. First, the apparatus 40 has fewer parts than the apparatus 10. The apparatus 40 costs approximately one-sixth as much as the apparatus 10 and requires less maintenance due to the reduction of parts. In addition, the use of a circular drive means which can be mounted on a shaft from a direction transverse to a longitudinal axis of the shaft, reduces down time of the treatment device associated with installation of the apparatus 10, resulting in further savings. It is anticipated that installation of the apparatus 40 will take approximately onesixth of the time required to install the apparatus 10. Reduced overall maintenance down time will also result due to the apparatus 40 in comparison to the apparatus 10.

Although the present invention has been described with respect to a specific embodiment thereof, various changes and modifications may be suggested to one skilled in the art and it is intended that the present invention encompass such changes and modifications as fall within the scope of the appended claims.

What is claimed is:

1. An apparatus for pre-spinning a container to be treated on an external surface by a treating surface of a rotating treatment device, comprising:

a belt positioned to selectively contact circumferential portions of the external surface of the container or a container support and to pre-spin the container, wherein the speed of the external surface of the container is approximately equal to the speed of the treating surface of the rotating treatment device; and a belt drive assembly operatively interconnected with said belt, comprising:

a first rotatable drive shaft; and first circular dive means mounted on said first rotatable drive shaft, said first circular drive means being at least partially split, said first circular drive means thereby being selectively connectable to said first rotatable drive shaft from a direction transverse to a longitudinal axis of said first rotatable drive shaft.

2. The apparatus of claim 1, further comprising:

a second rotatable drive shaft; and second circular drive means mounted on said second shaft and operatively associated with said first drive means.

3. The apparatus of claim 2, wherein:

said second circular drive means is at least partially split, said second circular drive means thereby being selectively connectable to said second rotatable drive shaft from a direction transverse to a longitudinal axis of said second rotatable drive shaft.

4. The apparatus of claim 2, further comprising:

third circular drive means mounted on said second rotatable drive shaft for driving said belt.

5. The apparatus of claim 4, wherein said third circular drive means comprises:

a timing pulley.

6. The apparatus of claim 2, wherein said first and second circular drive means comprise:

split mounted sprockets; and a chain therebetween.

7. The apparatus of claim 1, wherein:

said first drive shaft and the rotating treatment device are codriven.

8. The apparatus of claim 1, wherein said container support comprises a rotatable mandrel.

9. An apparatus for pre-spinning a container to be treated on an external surface by a treating surface of a rotating treatment device, comprising:

a belt positioned to selectively contact circumferential portions of the external surface of the container or a container support comprising a rotatable mandrel and to prespin the container, wherein speed of the external surface of the container is approximately equal to the speed of the treating surface of the rotating treatment device, and a belt drive assembly operatively interconnected with said belt, comprising:

a first rotatable drive shaft which is codriven with the rotating treatment device;

a first split mounted sprocket mounted on said first rotatable drive shaft, said first sprocket being selectively connectable to said first rotatable drive shaft from a direction transverse to a longitudinal axis of said first rotatable drive shaft;

a second rotatable drive shaft;

a second split mounted sprocket mounted on said second shaft, said second sprocket being selectively connectable to said second rotatable drive shaft from a direction transverse to a longitudinal axis of said second shaft;

a drive chain connected between said first sprocket and said second sprocket; and a timing pulley mounted on said second rotatable drive shaft, wherein said first sprocket drives said second sprocket through said chain, said second sprocket drives said second shaft which drives said timing pulley, and said timing pulley drives said belt.

* * * * *